US012459407B2

(12) United States Patent
Chen

(10) Patent No.: US 12,459,407 B2
(45) Date of Patent: Nov. 4, 2025

(54) CHILD CAR SEAT AND SEAT BACK ASSEMBLY THEREOF

(71) Applicant: BAMBINO PREZIOSO SWITZERLAND AG, Steinhausen (CH)

(72) Inventor: Hongbo Chen, Steinhausen (CH)

(73) Assignee: Bambino Prezioso Switzerland AG, Steinhausen (CH)

(*) Notice: Subject to any disclaimer, the term of this patent is extended or adjusted under 35 U.S.C. 154(b) by 25 days.

(21) Appl. No.: 18/028,405

(22) PCT Filed: Sep. 30, 2021

(86) PCT No.: PCT/EP2021/077006
§ 371 (c)(1),
(2) Date: Mar. 24, 2023

(87) PCT Pub. No.: WO2022/069667
PCT Pub. Date: Apr. 7, 2022

(65) Prior Publication Data
US 2023/0365034 A1 Nov. 16, 2023

(30) Foreign Application Priority Data
Sep. 30, 2020 (CN) .................. 202011073701.X

(51) Int. Cl.
B60N 2/28 (2006.01)
(52) U.S. Cl.
CPC ......... B60N 2/2872 (2013.01); B60N 2/2851 (2013.01)
(58) Field of Classification Search
CPC .................................................. B60N 2/2872
See application file for complete search history.

(56) References Cited

U.S. PATENT DOCUMENTS 11,731,545 B2 * 8/2023 Liu ...................... B60N 2/2851
297/256.11
11,993,186 B2 * 5/2024 Liu ...................... B60N 2/2851
(Continued)

FOREIGN PATENT DOCUMENTS

CA          1319095 C      6/1993
CN       201300753 Y       9/2009
(Continued)

OTHER PUBLICATIONS

"Notice of Allowance Issued in Corresponding Chinese Patent Application No. 202011073701.X", Mailed Date: May 8, 2024, 6 pages.
(Continued)

Primary Examiner — Timothy J Brindley
(74) Attorney, Agent, or Firm — Volpe Koenig

(57) ABSTRACT

The present disclosure discloses a seat back assembly including a backrest, a headrest and a side wing. The headrest is slidably installed at an upper end of the backrest, and the side wing is disposed on a side of the backrest and is capable of folding and unfolding relative to the backrest. The seat back assembly further includes a driving member, which is disposed on the backrest or the headrest and moves along with the headrest relative to the backrest. The headrest at least, relative to the backrest, has an initial position close to the backrest and an operation position driving the side wing to unfold relative to the backrest. The side wing is folded on the backrest when the headrest slides to a position between the initial position and the operation position.

19 Claims, 6 Drawing Sheets

(56) References Cited

U.S. PATENT DOCUMENTS

| | | | |
|---|---|---|---|
| 2020/0047647 A1* | 2/2020 | Oswald | B60N 2/2872 |
| 2020/0198503 A1 | 6/2020 | Häußler et al. | |
| 2020/0277013 A1 | 9/2020 | Kang | |
| 2022/0203871 A1* | 6/2022 | Fang | B60N 2/2872 |
| 2023/0294575 A1* | 9/2023 | Zhao | B60N 2/2851 |
| | | | 297/250.1 |

FOREIGN PATENT DOCUMENTS

| | | | | |
|---|---|---|---|---|
| CN | 103407388 A | | 11/2013 | |
| CN | 103921705 A | | 7/2014 | |
| CN | 204821212 U | | 12/2015 | |
| CN | 107791905 A | | 3/2018 | |
| CN | 107804203 A | | 3/2018 | |
| CN | 108437859 A | * | 8/2018 | B60N 2/2851 |
| CN | 209987783 U | | 1/2020 | |
| CN | 113071391 A | * | 7/2021 | |
| DE | 102014100380 A1 | | 7/2014 | |
| EP | 2384926 A1 | | 11/2011 | |
| EP | 2384926 B1 | | 12/2014 | |
| FR | 2794409 A1 | | 12/2000 | |
| GB | 2555914 B | * | 6/2021 | B60N 2/02 |
| JP | 2018039500 A | | 3/2018 | |
| KR | 78-0001297 Y1 | | 11/1978 | |
| KR | 200901086 A | | 10/2009 | |
| KR | 101866149 B1 | | 6/2018 | |
| TW | 201000342 A | | 1/2010 | |
| WO | WO-2008031583 A2 | * | 3/2008 | B60N 2/2851 |

OTHER PUBLICATIONS

International Search Report and Written Opinion for International Application No. PCT/EP2021/077006 dated Jan. 3, 2022.

Taiwanese Office Action for Application No. 110136115 dated Jul. 29, 2022.

Chinese Office Action issued in corresponding Application No. 202011073701.X dated Nov. 7, 2023. English translation included.

Notice of Reasons for Refusal issued in corresponding Japanese Application No. 2023-519209 dated Feb. 6, 2024. English Translation Included.

Notice of Allowance for corresponding Korean Application No. 10-2023-7010537 dated Sep. 25, 2025, 4 pages.

* cited by examiner

CHILD CAR SEAT AND SEAT BACK ASSEMBLY THEREOF

CROSS-REFERENCE TO RELATED APPLICATIONS

This application is a 371 National Phase of International Application No. PCT/EP2021/077006, filed on Sep. 30, 2021, which claims priority to Chinese Application No. 202011073701.X, filed on Sep. 30, 2020, which are incorporated herein by reference in their entirety.

TECHNICAL FIELD

The present invention relates to the field of child car seats, and more particularly, to a seat back assembly and a child car seat.

BACKGROUND

A child car seat is a device that is assembled in a vehicle and secures a child on the child car seat by a restraining device so as to ensure safety of the child. Child car seats are capable of minimizing the injury of a child in the case of emergency breaking or accidental collision, and are therefore widely accepted by consumers and extensively used worldwide.

A current child car seat usually includes a seat, a backrest connected to the seat, and a headrest and side wings connected to the backrest. The headrest and side wings are in general adjustable relative to the backrest to adapt to children of different body sizes. In one currently available child car seat, the side wings can be pivotally rotated by adjusting the height of the headrest relative to the backrest, thereby achieving the object of simultaneously adjusting the height of the headrest and the width of the side wings. However, such child car set has a complex structure that cannot be easily operated.

Therefore, there is a need for a seat back assembly having a simple structure and a child car seat thereof to overcome the issues above.

SUMMARY

It is an object of the present disclosure to provide a seat back assembly having a simple structure.

It is another object of the present disclosure to provide a child car seat having a simple structure.

To achieve the object above, the present disclosure provides a seat back assembly including a backrest, a headrest and a side wing. The headrest is slidably installed on an upper end of the backrest, and the side wing is disposed on a side of the backrest and is capable of folding and unfolding relative to the backrest. The seat back assembly further includes a driving member, which is disposed on the backrest or the headrest and capable of moving along with the headrest relative to the backrest. The headrest at least has, relative to the backrest, an initial position close to the backrest and an operation position driving the side wing to unfold relative to the backrest. The side wing is folded on the backrest when the headrest slides to a position between the initial position and the operation position. The driving member drives the side wing to unfold relative to the backrest when the headrest slides in a direction away from the backrest and passes beyond the operation position.

In an embodiment, the side wing is rotatably installed on the backrest.

In an embodiment, a lower end of the side wing is pivotally connected to the backrest.

In an embodiment, the driving member is slidably installed on the backrest.

In an embodiment, the seat back assembly of the present disclosure further includes a guide post disposed on a back portion of the backrest, and the driving member is slidably sleeved on the guide post.

In an embodiment, the guide post is in an extended arrangement in a height direction of the backrest.

In an embodiment, the driving member pushes the side wing to unfold relative to the backrest when the headrest slides in a direction away from the backrest and passes beyond the operation position.

In an embodiment, the side wing include a pushed structure projecting in a direction approaching the driving member, and the headrest drives the side wing to unfold relative to the backrest through pushing of the pushed structure by the driving member.

In an embodiment, the pushed structure is located above the driving member when the headrest is at the initial position, one of the driving member and the pushed structure is provided with an inclined plane structure, and the other of the driving member and the pushed structure faces the inclined plane structure.

In an embodiment, a limiting device for limiting a folding and unfolding amplitude of the side wings relative to the backrest is provided between the side wing and the backrest.

In an embodiment, the seat back assembly of the present disclosure further includes an elastic member disposed between the side wing and the backrest, and the elastic member has a tendency of constantly driving the side wing to fold relative to the backrest.

In an embodiment, the limiting device includes a slot structure and a protrusion structure disposed in the slot structure and slidable in the slot structure, the slot structure is disposed on one of the backrest and the side wing, and the protrusion structure is installed on the other of the backrest and the side wing.

In an embodiment, the elastic member is disposed on the back portion of the side wing, one end of the elastic member is connected to the protrusion structure, and the other end of the elastic member is connected to the side wing.

In an embodiment, the elastic member is a spring.

In an embodiment, an extension direction of the slot structure and a motion direction of the driving member are in an intersecting arrangement.

A child car seat of the present disclosure includes a seat body and the seat back assembly above, and a lower end of the backrest is installed on the seat body.

DETAILED DESCRIPTION

Figure 1:
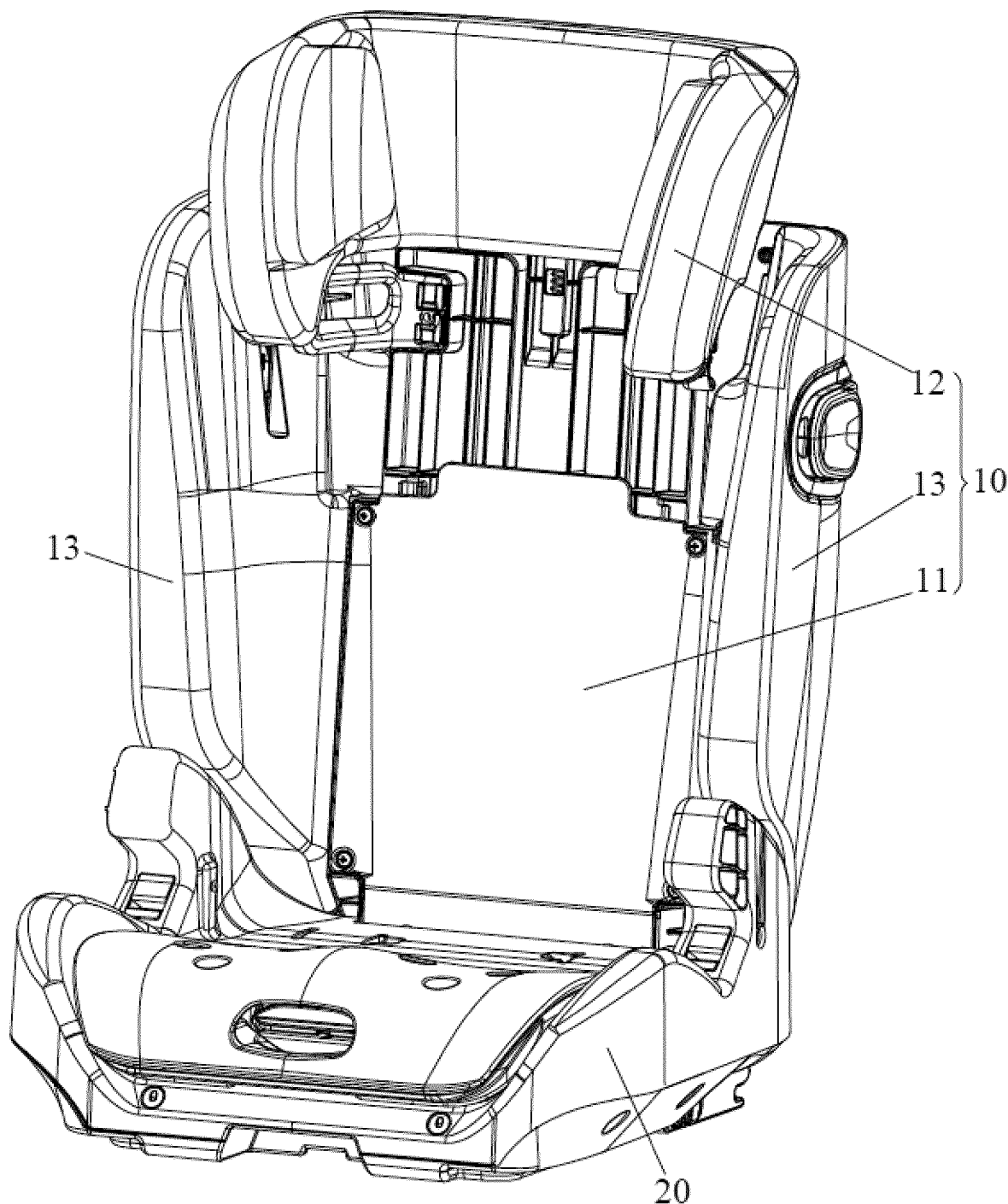
FIG. 1 is a three-dimensional structural schematic diagram of two side wings in a folded state relative to a backrest of a child car seat of the present disclosure.
Figure 2:
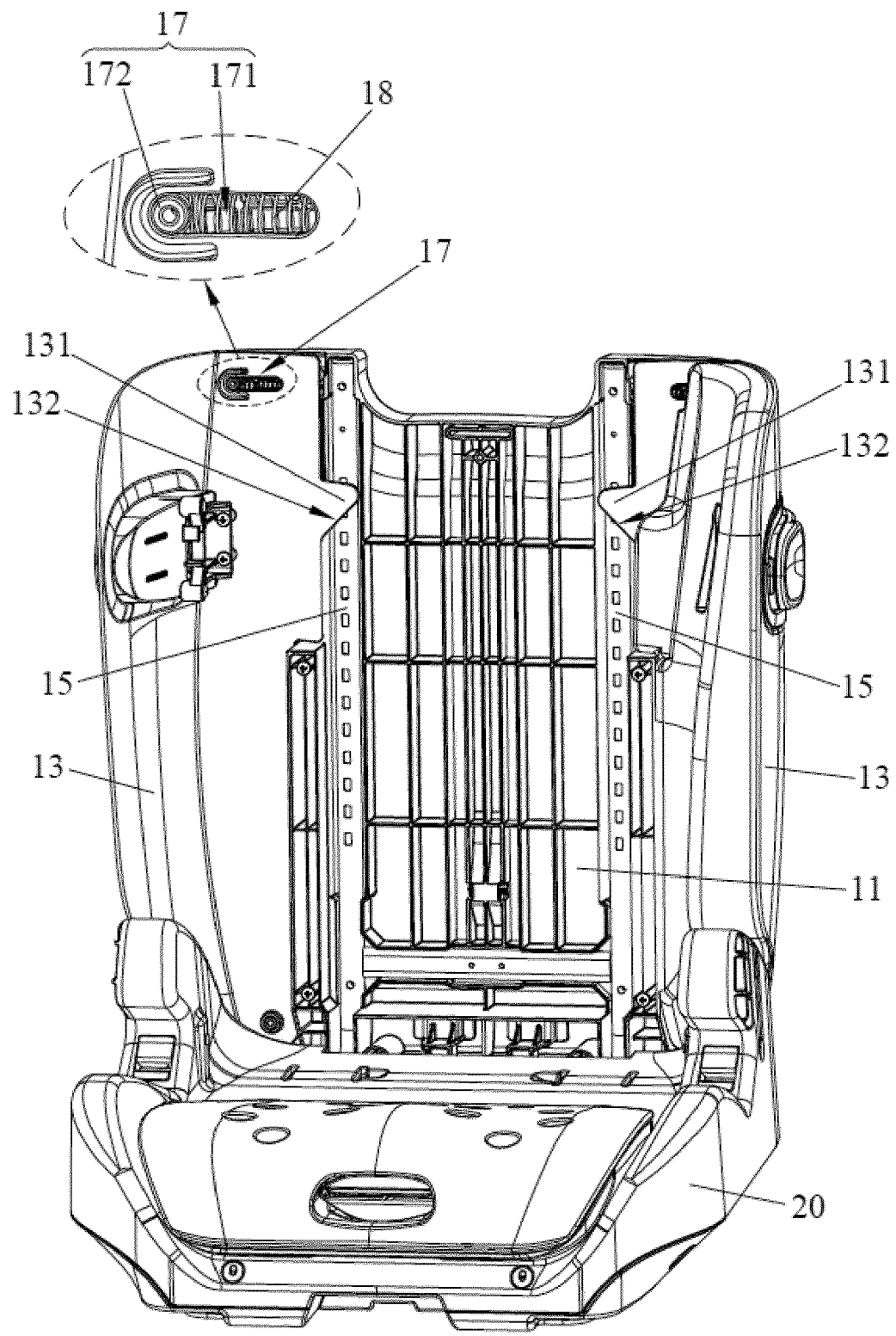
FIG. 2 is a three-dimensional structural schematic diagram of a child car seat of the present disclosure, in which partial structures of a headrest and an upper part of a backrest are hidden.

To better describe the technical contents and structural features of the present disclosure, embodiments are given in detail with the accompanying drawings below.

Compared to the prior art, the seat back assembly of the present disclosure further includes a driving member, which is disposed on the headrest and moves along with the headrest relative to the backrest. The headrest at least has, relative to the backrest, an initial position close to the backrest and an operation position driving the side wings to unfold relative to the backrest. The side wing is folded on the backrest when the headrest is positioned between the initial position and the operation position, and the driving member drives the side wing to unfold relative to the backrest when the headrest is away from the backrest and passes beyond the operation position. Thus, when the height of the headrest is adjusted, the headrest is capable of driving the two side wings to unfold through the driving member, thereby simultaneously adjusting the width between the two side wings while the headrest is adjusted, so as to provide ease of use of children of different body sizes and a simple operation. Meanwhile, the two side wings can be simultaneously driven to unfold by merely one driving member, hence significantly simplifying the structure of the seat back assembly.

It is understandable that the child car set having the seat back assembly of the present disclosure provides the same technical effects.

As shown in FIG. 1 to FIG. 6, a child car seat 100 of the present disclosure includes a seat back assembly 10 and a seat body 20. The seat back assembly 10 is disposed on an upper end of the seat body 20, and the seat back assembly 10 is supported and secured by the seat body 20. Specifically, the seat back assembly 10 includes a backrest 11, a headrest 12 and a side wing 13. The headrest 12 is slidably installed on an upper end of the backrest 11, so that the height of the headrest 12 is adjustable relative to the backrest 11. The side wing 13 is disposed on a side of the backrest 11 and is capable of folding and unfolding relative to the backrest 11, so that the side wing 13 can fold and unfold relative to the backrest 11. Preferably, the side wing 13 is disposed on each of both left and right sides of the backrest 11, a constant included angle is between a planar where the side wings 13 are located and a planar where the backrest 11 is located, and the two side wings 13, the backrest 11 and the seat body 20 jointly define an open cavity for seating a child. A user can adjust the headrest 12 on the backrest 11 to enable the headrest 12 to ascend and descend on the backrest 11, thereby corresponding the headrest 12 to the head of a child to provide ease of use for children of different body sizes. Moreover, the user adjusts the side wings 13 through the backrest 11, and the side wings 13 are enabled to unfold or fold relative to the backrest 11 and to be adjusted to the size of an open cavity, thereby providing ease of use for children of different body sizes and offering a child sitting on the child car seat 100 better protection. For example but not limited to, gear adjustment of the headrest 12 on the backrest 11 can be performed to readily adjust the height of the headrest 12. It should be noted that, the backrest 11, the headrest 12 and the side wing 13 of the present disclosure are implemented by known structures, and associated details thereof are omitted herein. The seat back assembly 10 is further described in detail in combination with FIG. 1 to FIG. 6 below.

As shown in FIG. 2 to FIG. 6, the seat back assembly 10 further includes a driving member 14, which is disposed on the headrest 12 and moves along with the headrest 12 relative to the backrest 11. The headrest 12 at least has, relative to the backrest 11, an initial position close to the backrest 11 (referring to FIG. 3) and an operation position driving the side wing 13 to unfold relative to the backrest 11 (referring to FIG. 4 and FIG. 5). The side wing 13 is folded on the backrest 11 when the headrest 12 slides to a position between the initial position and the operation position, and the driving member 14 drives the side wing 13 to unfold relative to the backrest 11 when the headrest 12 slides in a direction away from the backrest 11 and passes beyond the operation position. Thus, when the height of the headrest 12 is adjusted, the headrest 12 is capable of driving the two side wings 13 to unfold through the driving member 14, thereby synchronously adjusting the width between the two side wings 13 while the headrest 12 is adjusted, so as to provide ease of use for children of different body sizes and a simple operation. Meanwhile, the two side wings 13 can be driven to unfold by merely one driving member 14, hence significantly simplifying the structure of the seat back assembly 10. Specifically, the side wing 13 is rotatably installed on the backrest 11 so as to be readily adjusted to fold and unfold. Preferably, a preferred manner for realizing the rotatable installation of the side wing 13 on the backrest 11 is to have the lower end of the side wing 13 be pivotally connected to the backrest 11. Thus, the connection relation between the side wing 13 and the backrest 11 is simple and is easy for installation and arrangement.

As shown in FIG. 2 to FIG. 6, the driving member 14 is slidably installed on the backrest 11 to allow the headrest 12 to quickly drive the driving member 14 to move. Preferably, in order to allow the driving member 14 to slide more smoothly on the backrest 11, the seat back assembly 10 further includes a guide post 15 disposed on a back portion of the backrest 11, and the driving member 14 is slidably sleeved on the guide post 15. Preferably, the guide post 15 is arranged on each of both left and right sides of the back portion of the backrest 11. The guide post 15 is, for example but not limited to, a tubular plastic rod or a tubular metal rod, and the driving member 14 is, for example but not limited to, a tubular plastic member or tubular hardware member. To enhance structural stability of the two guide posts 15, a linking rod 16 is further installed between the two guide posts 15. Moreover, a top portion of the guide post 15 does not go beyond the side wing 13 in order to minimize undesirable effects on the appearance of the child car seat 10; in this embodiment, the top portion of the guide post 15 is, for example but not limited to, almost leveled with a top portion of the side wing 13. Specifically, the guide post 15 is in an extended arrangement in the height direction of the backrest 11. Thus, when the headrest 12 is adjusted away from the backrest 11, the driving member 14 is correspondingly driven to slide on the guide post 15, so that the driving member 14 directly and quickly slides upward along with the headrest 12. It should be noted that, in this embodiment, the driving member 14 can be disposed on the headrest 12 by means of a flexible member. For example, the driving member 14 can be connected to the headrest 12 by a rope or a steel wire. According to actual requirements, the driving member 14 may also be disposed on the headrest 12 by means of a rigid member. For example, the driving member 14 may be installed on the headrest 12 by a flexible pin. Alternatively, the driving member 14 may be, for example but not limited to, a part of the headrest 12. In other embodiments, the driving member 14 may further be disposed on the backrest 11 as long as the driving member 14 can move along with the headrest 12. Preferably, in this embodiment, the headrest 12 is located closely on the backrest 11 when the headrest 12 is at the initial position, and the headrest 12 at this moment is suitable for, for example but not limited to, a child of a small-sized body. When the headrest 12 is at the operation position, the headrest 12 is not too far away from the backrest 11, and the child car seat 100 is suitable for, for example but not limited to, a child of a medium-sized or smallsized body. In response to different application requirements, the operation position above may be adjusted.

As shown in FIG. 2 to FIG. 6, when the headrest 12 slides in a direction away from the backrest 11 and passes beyond the operation position, the driving member 14 pushes the side wing 13 to unfold relative to the backrest 11. Thus, the transmission relation between the driving member 14 and the side wing 13 is simple and convenient for arrangement. Specifically, the side wing 13 is provided with a pushed structure 131 projecting in a direction approaching the driving member 14. The headrest 12 drives the side wing 13 to unfold relative to the backrest 11 through the driving member 14 pushing the pushed structure 131, so that the driving member 14 readily pushes the side wing 13 to unfold by means of the pushed structure 131. For example, in this embodiment, the pushed structure 131 is a sheet-like structure. According to actual requirements, the pushed structure 131 may be configured as, for example but not limited to, a block-like structure or a pin-like structure. To provide better push coordination between the pushed structure 131 and the driving member 14, the driving member 14 is connected to, for example but not limited to, a pushing portion (not shown). It is understandable that the pushing portion is located right below the pushed structure 131, the pushing portion moves along with the driving member 14, and the driving member 14 drives the side wing 13 to unfold by means of mutual pushing between the pushing portion and pushed structure 131. Preferably, the pushing portion is, for example but not limited to, included in the driving member 14. More specifically, the pushed structure 131 is above the driving member 14 when the headrest 12 is at the initial position. The pushed structure 131 is provided with an inclined plane structure 132, and the driving member 14 faces the inclined plane structure 132. The driving member 14 is capable of readily driving the side wing 13 to rotate and unfold through the inclined plane structure 132. According to actual requirements, the inclined plane structure 132 can be disposed on the driving member 14, similarly achieving the object of readily driving the side wing 13 to rotate and unfold.

As shown in FIG. 2 to FIG. 6, a limiting device 17 for limiting a folding and unfolding amplitude of the side wing 13 relative to the backrest 11 is provided between the side wing 13 and the backrest 11. The side wing 13 is enabled to rotate within a certain range by the limiting device 17, hence preventing excessive folding and unfolding of the side wing 13 and ensuring normal use of the side wing 13. To enable the side wing 13 to automatically fold relative to the backrest 11 in a normal condition, the seat back assembly 10 further includes an elastic member 18 disposed between the side wing 13 and the backrest 11, wherein the elastic member 18 has a tendency of constantly driving the side wing 13 to fold relative to the backrest 11. Thus, the unfolded side wing 13 can be automatically reset by the elastic member 18 so as to facilitate automatic folding of the side wing 13. Specifically, the limiting device 17 includes a slot structure 171, and a protrusion structure 172 disposed in the slot structure 171 and slidable in the slot structure 171. The slot structure 171 is disposed on the side wing 13 and the protrusion structure 172 is installed on the backrest 11 such that the limiting device 17 has a simple structure and convenience for arrangement and installation. According to actual requirements, in other embodiments, the slot structure 171 can be disposed on the backrest 11 and the protrusion structure 172 can be installed on the side wing 13 so as to achieve the object of limiting the folding and unfolding amplitude of the side wing 13. For example, the protrusion structure 172 is, but not limited to, a pin. More specifically, the elastic member 18 is disposed on the back portion of the side wing 13, one end of the elastic member 18 is connected to the protrusion structure 172, and the other end of the elastic member 18 is connected to the side wing 13. Because the elastic member 18 is disposed at the back portion of the side wing 13, the elastic member 18 is easy to be hidden and the structure of the seat back assembly 10 is more compact. To readily install the elastic member 18 on the side wing 13, the back portion of the side wing 13 is provided with a stop block 133. One end of the elastic member 18 is connected to the protrusion structure 172, and the other end of the elastic member 18 is connected to the stop block 133. For example, in this embodiment, the elastic member 18 is but not limited to a spring, such as a tension spring, a compression spring or a torsion spring. To allow the side wing 13 to be smoothly rotated for unfolding or folding when the protrusion structure 172 slides in the slot structure 171, an extension direction of the slot structure 171 and a motion direction of the driving member 14 are in an intersecting arrangement.

Figure 3:
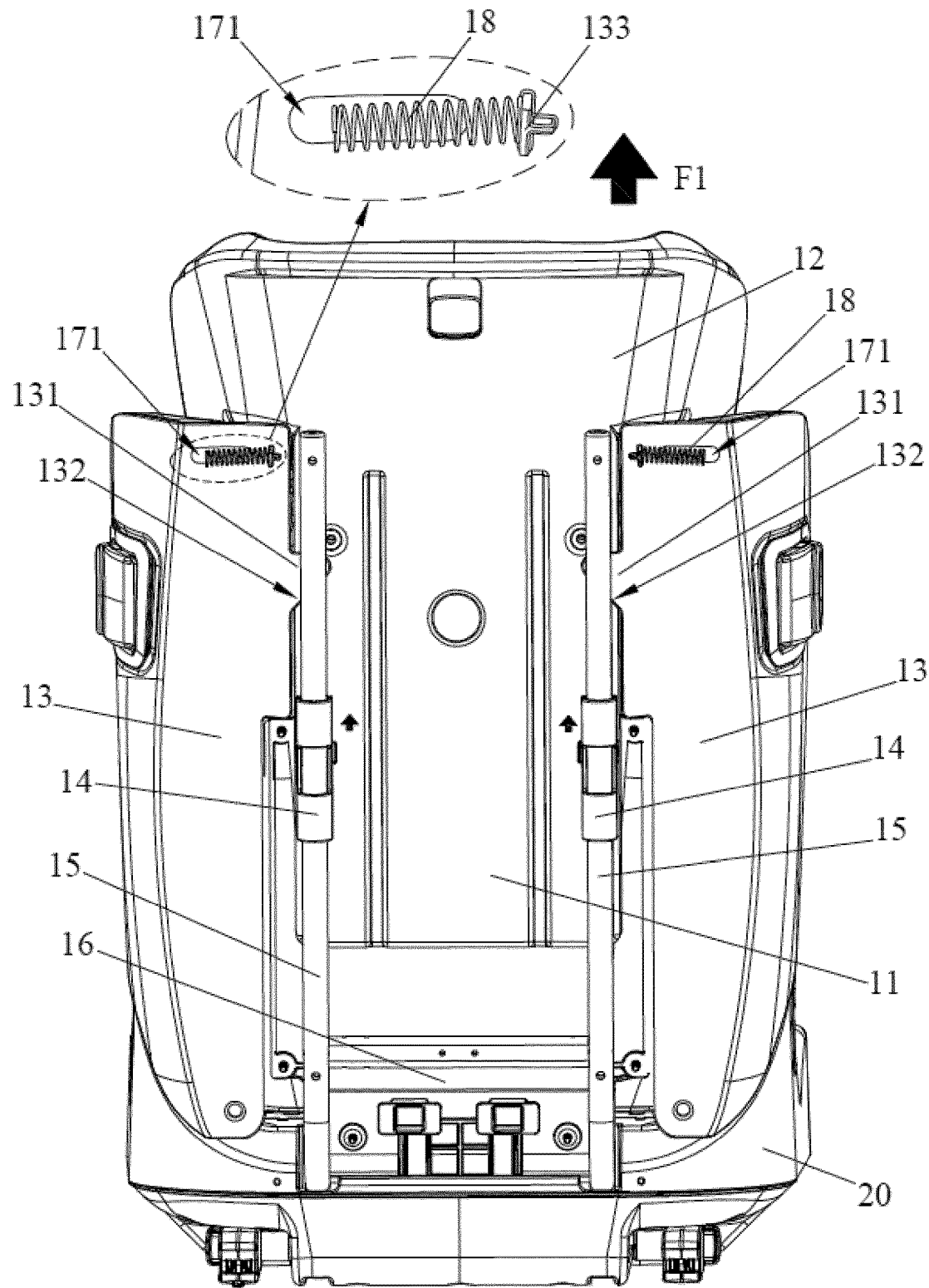
FIG. 3 is a planar structural schematic diagram of a child car seat of the present disclosure viewing from a rear side, in which a protrusion structure is hidden and a headrest is at an initial position.
Figure 4:
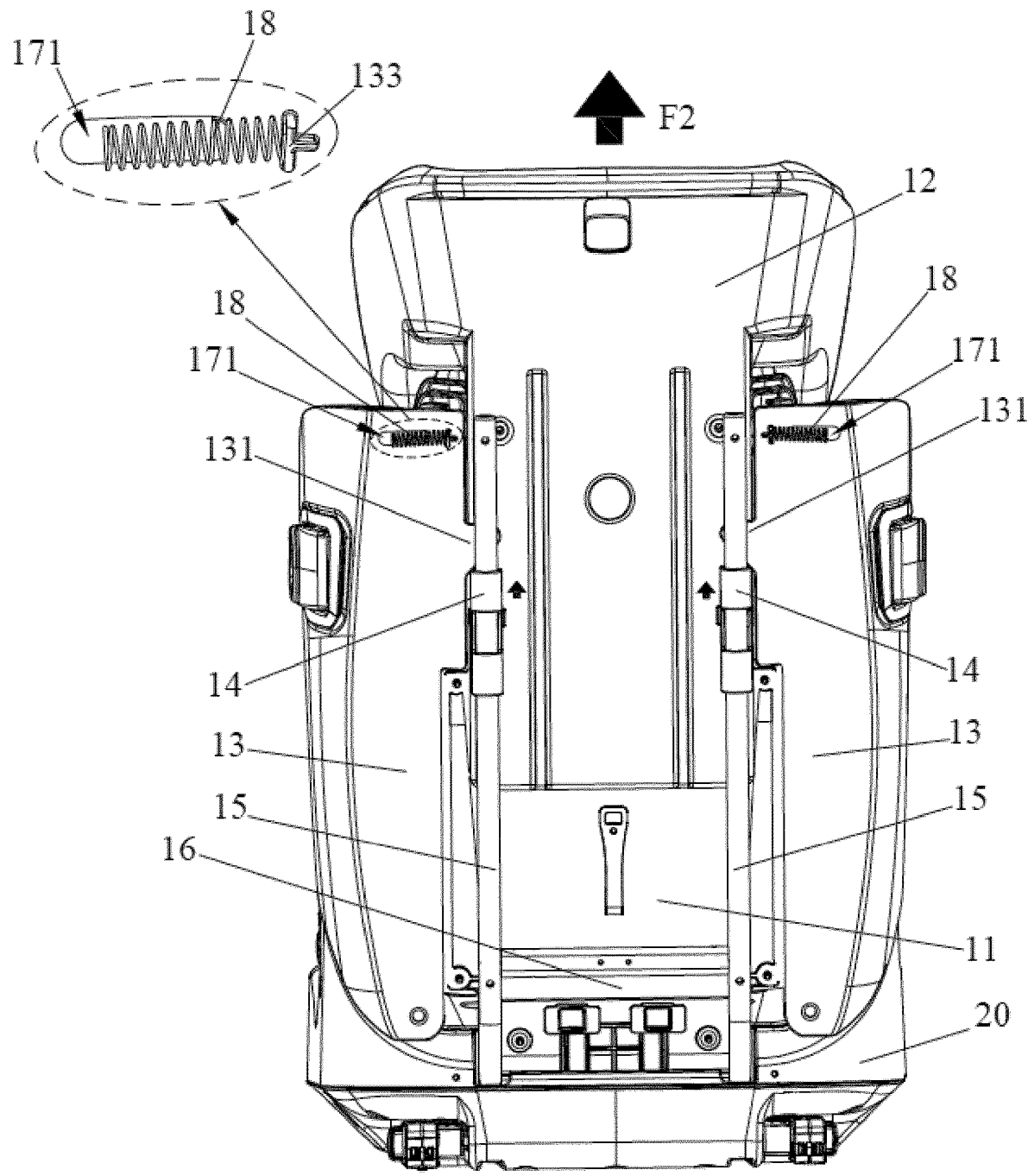
FIG. 4 is a planar structural schematic diagram of a child car seat of the present disclosure viewing from a rear side, in which a protrusion structure is hidden and a headrest is at an operation position.
Figure 5:
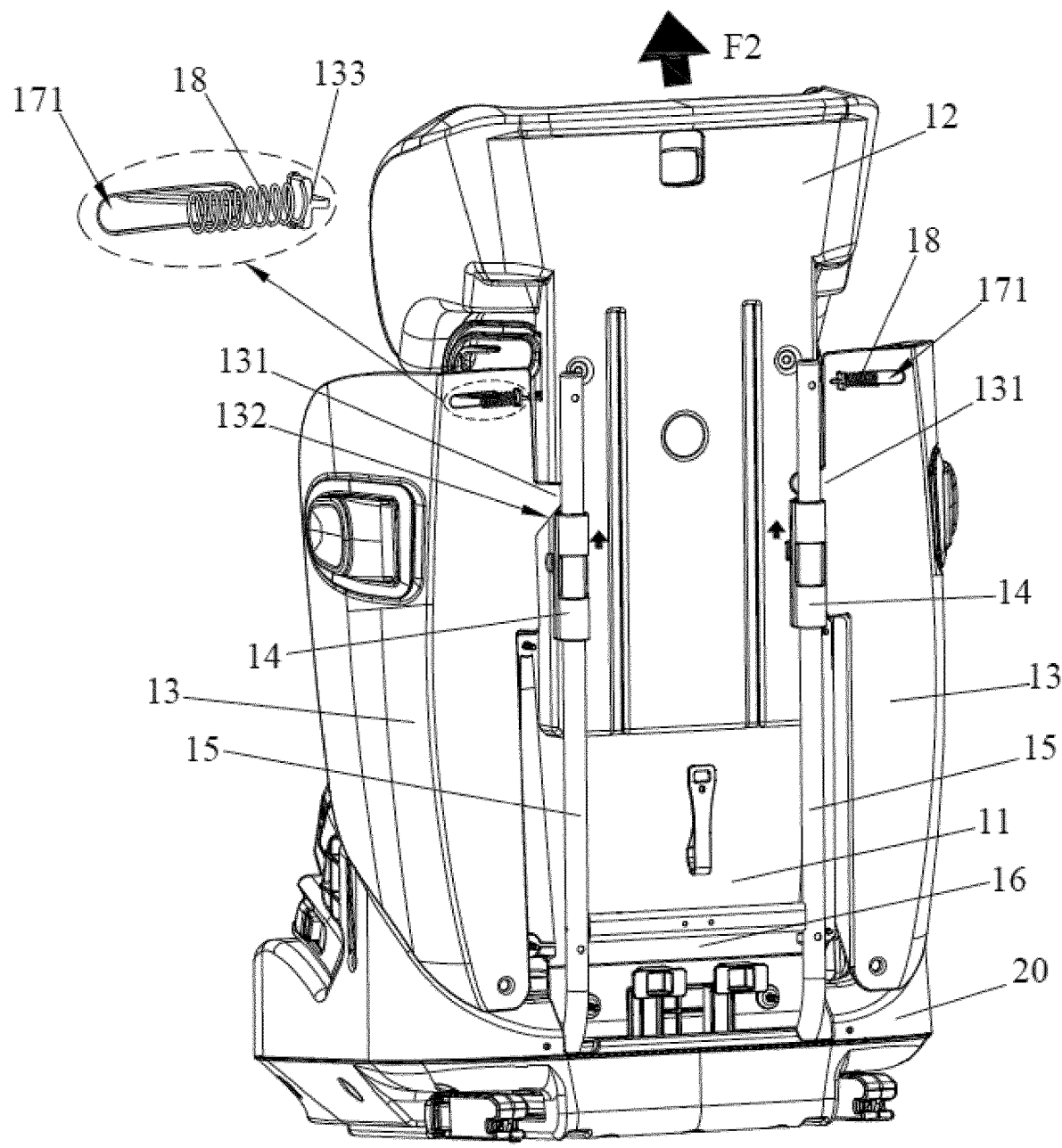
FIG. 5 is a three-dimensional structural schematic diagram of a child car seat of the present disclosure from another angle.
Figure 6:
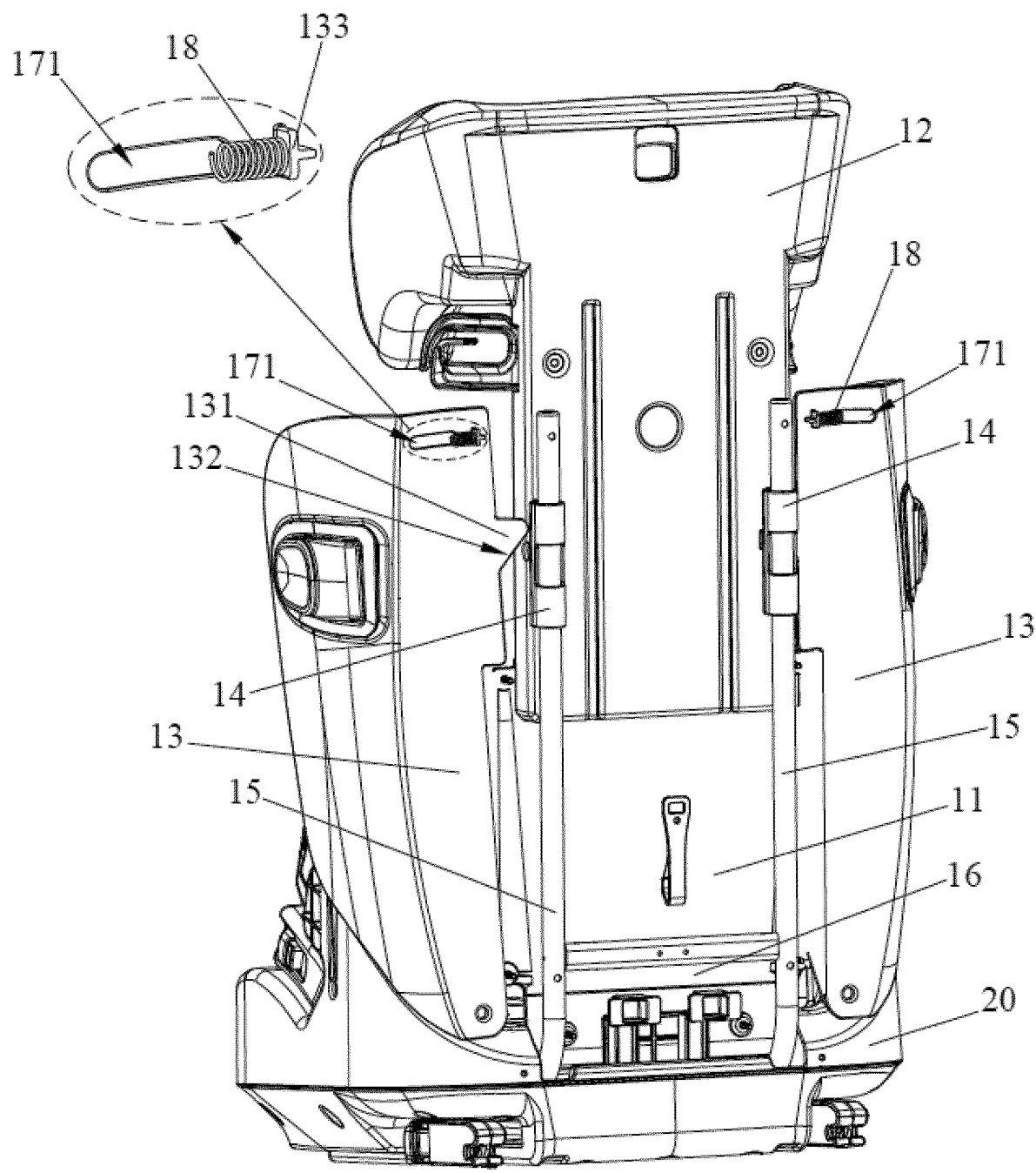
FIG. 6 is a three-dimensional structural schematic diagram of a child car seat of the present disclosure, in which a protrusion structure is hidden and a headrest slides away from a backrest and passes beyond an operation position.

The operating principle of the child car seat 100 of the present disclosure is described in combination with FIG. 1 to FIG. 6. To use the child car seat 100, the headrest 12 is lifted or pressed downward according to the body size of a child, so that the headrest 12 corresponds to the head of the child. As shown in FIG. 3, when the headrest 12 is at a low gear, that is, the headrest 12 is between the initial position and the operation position, the driving member 14 is away from the pushed structure 131, so the driving member 14 does not push the pushed structure 131. Since the elastic member 18 is not pressed, the two side wings 13 are folded on the backrest 11 as a result of the elastic member 18. At this moment, the cavity jointly defined by the two side wings 13, the backrest 11 and the seat body 20 is smaller so the child car seat 100 of the present disclosure is suitable for seating a child of a smaller body size. When the headrest 12 is adjusted from a low gear to a higher gear, that is, the headrest 12 is lifted along the direction F1 in FIG. 3, the headrest 12 drives the driving member 14 to move upward such that the driving member 14 gradually approaches the pushed structure 131. When the headrest 12 arrives at the operation position, the driving member 14 pushes against the inclined plane structure of the pushed structure 131, and the state of the child car seat 100 at this moment is shown in FIG. 4 and FIG. 5. When the headrest 12 is continually lifted along the direction F2 in FIG. 4 and FIG. 5, the driving member 14 starts to push the pushed structure 131 when the headrest 12 passes beyond the operation position so the side wing 13 rotates and unfolds relative to the backrest 11. At this moment, the cavity jointly defined by the two side wings 13, the backrest 11 and the seat body 20 gradually increases. Meanwhile, the protrusion structure 172 slides in the slot structure 171, and the protrusion structure 172 pushes the elastic member 18 to compress. At this moment, the state of the child car seat 100 is shown in FIG. 6, and the child car seat 100 is suitable for seating a child of a larger body size.

Once the child car seat 100 is no longer used, the headrest 12 may be adjusted to a low gear, so that the driving member 14 becomes away from the pushed structure 131 and the elastic member 18 is restored to an original state, and the restored elastic member 18 then drives the side wing 13 to fold relative to the backrest 11, hence achieving resetting the child car seat 100 of the present disclosure for the next use.

Compared to the conventional art, the seat back assembly 10 of the present disclosure further includes the driving member 14, which is disposed on the headrest 12 and moves along with the headrest 12 relative to the backrest 11. The headrest 12 at least has, relative to the backrest 11, an initial position close to the backrest 11 and an operation position driving the side wing 13 to unfold relative to the backrest 11. The side wing 13 is folded on the backrest 11 when the headrest 12 is positioned between the initial position and the operation position, and the driving member 14 drives the side wing 13 to unfold relative to the backrest 11 when the headrest 12 is away from the backrest 11 and passes beyond the operation position. Thus, when the height of the headrest 12 is adjusted, the headrest 12 is capable of driving the two side wings 13 to unfold through the driving member 14, thereby simultaneously adjusting the width between the two side wings 13 while the headrest 12 is adjusted, so as to provide ease of use for children of different body sizes and a simple operation. Meanwhile, the two side wings 13 can be simultaneously driven to unfold while the headrest 12 is adjusted by merely one driving member 14, hence significantly simplifying the structure of the seat back assembly 10.

It is understandable that the child car seat 100 having the seat back assembly 10 of the present disclosure achieves the same technical effects.

The preferred embodiments of the present disclosure are disclosed above, and are not to be construed as limitations to the scope of claims of the present disclosure. Therefore, all equivalent modifications made to the claims of the present disclosure are to be encompassed within the scope of the present disclosure.

What is claimed is:

1. A seat back assembly, comprising:
a backrest;
a headrest slidably installed at an upper end of the backrest;
a side wing disposed on a side of the backrest and capable of folding and unfolding relative to the backrest, the side wing comprising a stop block provided on a back portion of the side wing;
an elastic member comprising an end connected to the stop block;
a driving member disposed on the backrest or the headrest and moving along with the headrest relative to the backrest,
a guide post disposed on a back portion of the backrest, wherein the driving member is slidably sleeved on the guide post;
wherein the headrest at least, relative to the backrest, has an initial position close to the backrest and an operation position driving the side wing to unfold relative to the backrest, the side wing is folded on the backrest when the headrest slides to a position between the initial position and the operation position, and the driving member drives the side wing to unfold relative to the backrest when the headrest slides in a direction away from the backrest and passes beyond the operation position.

2. The seat back assembly according to claim 1, wherein the side wing is rotatably installed on the backrest.

3. The seat back assembly according to claim 1, wherein a lower end of the side wing is pivotally connected to the backrest.

4. The seat back assembly according to claim 1, wherein the driving member is slidably installed on the backrest.

5. The seat back assembly according to claim 1, wherein the guide post is in an extended arrangement in a height direction of the backrest.

6. The seat back assembly according to claim 1, wherein the driving member pushes the side wing to unfold relative to the backrest when the headrest slides in a direction away from the backrest and passes beyond the operation position.

7. The seat back assembly according to claim 6, wherein the side wing is provided with a pushed structure projecting in a direction approaching the driving member, and the headrest drives the side wing to unfold relative to the backrest through pushing of the pushed structure by the driving member.

8. The seat back assembly according to claim 7, wherein the pushed structure is located above the driving member when the headrest is at the initial position, one of the driving member and the pushed structure is provided with an inclined plane structure, and the other of the driving member and the pushed structure faces the inclined plane structure.

9. The seat back assembly according claim 1, wherein a limiting device for limiting a folding and unfolding amplitude of the side wing relative to the backrest is provided between the side wing and the backrest.

10. The seat back assembly according to claim 9, wherein the elastic member is disposed between the side wing and the backrest, wherein the elastic member has a tendency of constantly driving the side wing to fold relative to the backrest.

11. The seat back assembly according to claim 10, wherein the limiting device comprises a slot structure and a protrusion structure disposed in the slot structure and slidable in the slot structure, the slot structure is disposed on one of the backrest and the side wing, and the protrusion structure is installed on the other of the backrest and the side wing.

12. The seat back assembly according to claim 11, wherein another end of the elastic member is connected to the protrusion structure.

13. The seat back assembly according to claim 11, wherein an extension direction of the slot structure and a motion direction of the driving member are in an intersecting arrangement.

14. The seat back assembly according to claim 11, wherein the elastic member is a spring.

15. A child car seat, comprising a seat back assembly and a seat body, wherein the seat back assembly is described as claim 1, and a lower end of the backrest is installed on the seat body.

16. A seat back assembly, comprising:
a backrest;

a headrest, the headrest slidably installed at an upper end of the backrest;

a side wing, the side wing disposed on a side of the backrest and capable of folding and unfolding relative to the backrest; and a driving member disposed on the backrest or the headrest and moving along with the headrest relative to the backrest, wherein the headrest at least, relative to the backrest, has an initial position close to the backrest and an operation position driving the side wing to unfold relative to the backrest, the side wing is folded on the backrest when the headrest slides to a position between the initial position and the operation position, and the driving member drives the side wing to unfold relative to the backrest when the headrest slides in a direction away from the backrest and passes beyond the operation position, wherein a limiting device for limiting a folding and unfolding amplitude of the side wing relative to the backrest is provided between the side wing and the backrest, wherein the seat back assembly further comprises an elastic member disposed between the side wing and the backrest, wherein the elastic member has a tendency of constantly driving the side wing to fold relative to the backrest, wherein the limiting device comprises a slot structure and a protrusion structure disposed in the slot structure and slidable in the slot structure, the slot structure is disposed on one of the backrest and the side wing, and the protrusion structure is installed on the other of the backrest and the side wing, wherein the elastic member is disposed on a back portion of the side wing, one end of the elastic member is connected to the protrusion structure, and the other end of the elastic member is connected to the side wing.

17. A seat back assembly, comprising:

a backrest;

a headrest slidably disposed at an upper end of the backrest;

a side wing disposed on a side of the backrest;

a limiting device disposed between the side wing and the backrest, the limiting device comprising a slot structure and a protrusion structure slidably disposed in the slot structure; and an elastic member disposed between the side wing and the backrest, the elastic member disposed on a back portion of the side wing, the elastic member comprising a first end connected to the protrusion structure, and a second end connected to the side wing.

18. The seat back assembly according to claim 17, wherein the elastic member has a tendency of constantly driving the side wing to fold relative to the backrest.

19. The seat back assembly according to claim 17, wherein the slot structure is disposed on one of the backrest and the side wing, and the protrusion structure is installed on the other of the backrest and the side wing.

\* \* \* \* \*